Aug. 8, 1939.  E. DU B. LUKIS  2,168,418
PHOTOGRAPHIC PLATE HOLDER
Filed Jan. 21, 1938
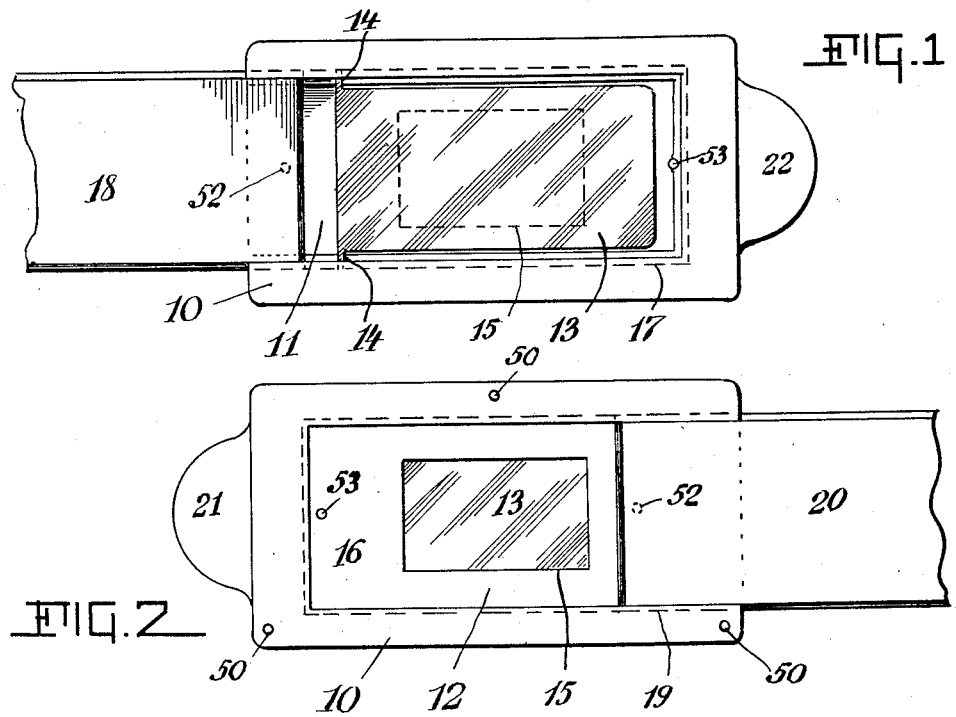
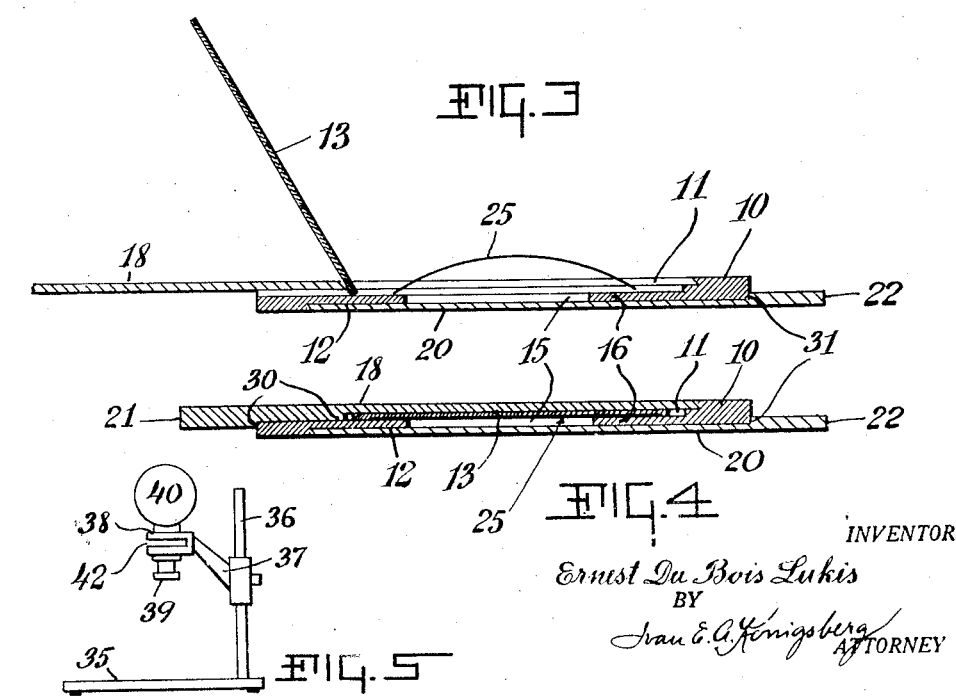
INVENTOR.
Ernest Du Bois Lukis
BY
Ivan E. A. Konigsberg
ATTORNEY Patented Aug. 8, 1939

2,168,418

UNITED STATES PATENT OFFICE 2,168,418

PHOTOGRAPHIC PLATE HOLDER

Ernest du Bois Lukis, New York, N. Y., assignor to E. Leitz, Inc., a corporation of New York Application January 21, 1938, Serial No. 186,066

1 Claim. (Cl. 88—24)

The object of this invention is to provide an improved photographic plate holder especially adapted to contain photographic film for use in photographic apparatus, especially enlargers. One object of the invention is to provide, as a new article of manufacture, a photographic plate holder for use with enlarging apparatus either for enlarging purposes or for direct photographic purposes. Another object is to provide a plate holder to be made and sold as an accessory to photographic enlargers of different types and dimensions. Still another object is to provide a photographic film holder having means such as a hinged member for flattening the film and keeping the film flat without scratching it.

With the foregoing and other objects in view the invention is embodied in a photographic plate holder constructed as hereinafter set forth and as illustrated in the accompanying drawing in which—

Fig. 1 is a top plan view of the plate holder partly open and with parts broken away.

Fig. 2 is a bottom view of the plate holder partly open to show the exposure opening and with parts broken away.

Fig. 3 is a longitudinal sectional view of the plate holder showing the same fully opened to be loaded with film.

Fig. 4 is a longitudinal sectional view of the plate holder showing it closed and loaded with film.

Fig. 5 is an outline view of an enlarging apparatus with which the improved plate holder may be used.

Referring to the drawing the plate holder consists of a rectangular frame 10 the central portion of which is depressed or recessed on both sides so as to form a top recess 11 and a bottom recess 12. The top recess 11 is deeper than the bottom recess so as to make room for a film flattening and holding member 13 in the form of a thin plate which is pivoted in the top recess 11 by means of pintles as shown at 14, 14. The numeral 15 denotes an exposure opening extending through the wall 16 which lies between the two recesses 11 and 12.

The top recess 11 is provided with undercut ways 17 in which a top cover 18 is adapted to slide in over and on top of the plate 13 to keep the latter in position and close the plate holder in the top as shown in Fig. 4, the cover having overhanging portions 30 for closing the recess 11 lighttight.

The bottom recess is provided with undercut ways 19 in which a bottom cover 20 is adapted to slide to close up the exposure opening from below, the cover 20 having an overhanging portion 31 for closing the recess 12 lighttight.

The plate holder as an article of manufacture and photographic accessory is complete as it appears in section in Fig. 4 where both the slides 18 and 20 are completely closed. Both slides have grip portions 21 and 22 respectively for moving them in and out as will be understood. When the plate holder is to be used, the top slide 18 is removed or pulled out as in Fig. 3 and the film holding member 13 opened up. A piece of film 25 is placed over the exposure opening 15 with the sensitized surface down. The film is shown curved because that is the natural form of a piece of film when it is cut from a strip. Then the member 13 is dropped down on the film whereby the latter is automatically flattened in proper position within the top recess 11 and over the exposure opening. Next the top slide cover 18 is pushed in over the member 13 as in Fig. 4 and the holder is now loaded with film 25 ready for use. This loading operation takes place in the darkroom. The film is now within the holder protected against light. The holder may be handled in daylight and is now inserted in the enlarger or other photographic apparatus the same as plate holders are inserted in cameras. When an exposure is to be made, the bottom slide cover is pulled out as in Fig. 2 and the film is exposed through the opening 15. Thereafter the bottom cover 20 is closed and the plate holder with the exposed film is removed, opened and the film taken out to be developed.

Fig. 5 shows a well known type of photographic enlarging apparatus which comprises a base 35 having an upright 36 upon slides a bracket 37 whereby to focus the objective 39. The latter is carried by a frame 38 and above the latter there is a casing 40 which contains an electric lamp, not shown. The frame 38 has a recess 42 adapted to receive a plate holder. In the manufacture of enlargers the recess 42 is made of certain definite size to accommodate a plate holder specially made to fit the recess. Hence, the instant plate holder will be made to fit recesses of particular enlargers with which the plate holder is to be used. The particular dimensions of the plate holder and the shape thereof as disclosed illustrate only one example embodying the features of the invention. In the drawing the several parts in cross section are shown much enlarged for the sake of clearness. The particular manner of making and assembling the several parts is not illustrated.

The several members of the frame itself may conveniently be made of suitably cut out and shaped layers of metal. This being no part of the invention is not shown.

If it is desired to enlarge a developed picture on a film the following method may be used. The film picture is placed in the recess 42 and focused upon a piece of paper which is placed upon the base 35. Thereafter said paper is removed, a sensitized paper placed on the base and exposed to photograph an enlarged reproduction of the film picture.

The enlarger may also be used for photographing an object placed on the base 35. In this case any film picture in the enlarger is focused as described above. Thereafter the object to be photographed is placed on the base 35. The instant plate holder loaded with an unexposed film is inserted in the frame recess 42 and the bottom cover 20 is opened. Light is caused to fall upon the object which is then photographed upon the film 25. Then the plate holder is closed and removed to develop the film as will be understood.

It will be seen therefore that in order to position the exposure opening 13 in the optical axis of the enlarger or other photographic apparatus, and in order to place said opening laterally in correct relation to said optical axis it is necessary that some means be provided for positioning the plate holder accurately in the apparatus. Such means of course takes various forms depending upon the type of enlarger used. However, to illustrate by way of example one type of guiding means, the plate holder herein disclosed is provided with three pins 50, 50 shown only in Fig. 2. These pins will be positioned to fit corresponding guiding means in the enlarger recess, not shown.

In other types of enlargers the shape and dimension of the plate holder frame may serve to guide it into position. It will further be understood that it is not material whether the covers are movable in the same direction or from any particular side of the frame. Neither is the precise position of the pivoting means for the member 13 material. In fact, it is within the scope of the invention to employ a film flattening member which is not hinged to the plate holder but merely laid down upon the film before the top cover is closed. The covers may have punched up buttons 52 adapted to snap into depressions 53 or vice versa, whereby to prevent accidental displacement of the covers.

I claim—

A photographic film plate holder comprising a relatively thin flat rectangular frame having an exposure opening through the same, a hinged member within said frame being swingably moved into a relatively open position to admit a piece of film to be placed over the exposure opening in the frame, said member being swingably moved into a relatively closed position to contact said film to flatten the same without scratching that part of the film which covers the said opening, said member being larger than the film so as to overlap the same, a removable top cover to keep the said member in contacting relation with the film and for closing the frame lighttight from above and a removable bottom cover for closing the frame lighttight from below, said covers being countersunk within the said frame.

ERNEST DU BOIS LUKIS.